United States Patent
Aragon

(10) Patent No.: US 8,150,357 B2
(45) Date of Patent: Apr. 3, 2012

(54) SMOOTHING FILTER FOR IRREGULAR UPDATE INTERVALS

(75) Inventor: David B. Aragon, Berkeley, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 875 days.

(21) Appl. No.: 12/057,904

(22) Filed: Mar. 28, 2008

(65) Prior Publication Data

US 2009/0247103 A1  Oct. 1, 2009

(51) Int. Cl.
*H04B 1/10* (2006.01)
*H04B 17/00* (2006.01)

(52) U.S. Cl. ............ 455/307; 455/213; 455/226.2; 455/134

(58) Field of Classification Search ........... 455/226.2, 455/130, 134, 137, 186.1, 213, 226.1, 277.2, 455/286, 293, 307, 306, 339
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | de Couasnon et al. |
| 4,176,316 A | 11/1979 | DeRosa et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |

(Continued)

FOREIGN PATENT DOCUMENTS

EP  0 992 921 A2  4/2000

(Continued)

OTHER PUBLICATIONS

Acampora and Winters, "A Wireless Network for Wide-Band Indoor Communications," IEEE Journal on selected Areas in Communications, vol. SAC-5, No. 5, Jun. 1987, pp. 796-804.

(Continued)

*Primary Examiner* — Pablo Tran

(57) ABSTRACT

A technique for determining a received signal strength from multiple messages filters noise from the received signal to provide an accurate signal strength value. Advantageously, the more accurate output signal strength value can be used to identify movement of a station as well as estimate locations and direction of movement.

20 Claims, 11 Drawing Sheets

U.S. PATENT DOCUMENTS

| | | |
|---|---|---|
| 4,850,009 A | 7/1989 | Zook et al. |
| 4,872,182 A | 10/1989 | Mcrae et al. |
| 4,894,842 A | 1/1990 | Broekhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Lim |
| 5,231,633 A | 7/1993 | Hluchy et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A * | 6/2000 | De Vries ...................... 708/321 |
| 6,078,568 A | 6/2000 | Wright |
| 6,088,591 A | 7/2000 | Trompower et al. |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Birukawa et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright et al. |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watanabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,574,240 B1 | 6/2003 | Tzeng |
| 6,580,700 B1 | 6/2003 | Pinard et al. |
| 6,587,680 B1 | 7/2003 | Ala-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |

| | | | |
|---|---|---|---|
| 6,624,762 B1 | 9/2003 | End, III | |
| 6,625,454 B1 | 9/2003 | Rappaport et al. | |
| 6,631,267 B1 | 10/2003 | Clarkson et al. | |
| 6,650,912 B2 * | 11/2003 | Chen et al. ................... 455/574 | |
| 6,658,389 B1 | 12/2003 | Alpdemir | |
| 6,659,947 B1 | 12/2003 | Carter et al. | |
| 6,661,787 B1 | 12/2003 | O'Connell et al. | |
| 6,674,403 B2 | 1/2004 | Gray et al. | |
| 6,677,894 B2 | 1/2004 | Sheynblat et al. | |
| 6,678,516 B2 | 1/2004 | Nordman et al. | |
| 6,678,802 B2 | 1/2004 | Hickson | |
| 6,687,498 B2 | 2/2004 | McKenna et al. | |
| 6,697,415 B1 | 2/2004 | Mahany | |
| 6,721,334 B1 | 4/2004 | Ketcham | |
| 6,725,260 B1 | 4/2004 | Philyaw | |
| 6,738,629 B1 | 5/2004 | McCormick et al. | |
| 6,747,961 B1 | 6/2004 | Ahmed et al. | |
| 6,756,940 B2 | 6/2004 | Oh et al. | |
| 6,760,324 B1 | 7/2004 | Scott et al. | |
| 6,785,275 B1 | 8/2004 | Boivie et al. | |
| 6,798,788 B1 | 9/2004 | Viswanath et al. | |
| 6,801,782 B2 | 10/2004 | McCrady et al. | |
| 6,826,399 B1 | 11/2004 | Hoffman et al. | |
| 6,839,338 B1 | 1/2005 | Amara et al. | |
| 6,839,348 B2 | 1/2005 | Tang et al. | |
| 6,839,388 B2 | 1/2005 | Vaidyanathan | |
| 6,847,620 B1 | 1/2005 | Meier | |
| 6,847,892 B2 | 1/2005 | Zhou et al. | |
| 6,856,800 B1 | 2/2005 | Henry et al. | |
| 6,879,812 B2 | 4/2005 | Agrawal et al. | |
| 6,901,439 B1 | 5/2005 | Bonasia et al. | |
| 6,917,688 B2 * | 7/2005 | Yu et al. ................... 381/94.7 | |
| 6,934,260 B1 | 8/2005 | Kanuri | |
| 6,937,566 B1 | 8/2005 | Forslow | |
| 6,938,079 B1 | 8/2005 | Anderson et al. | |
| 6,957,067 B1 | 10/2005 | Iyer et al. | |
| 6,973,622 B1 | 12/2005 | Rappaport et al. | |
| 6,978,301 B2 | 12/2005 | Tindal | |
| 6,980,533 B1 | 12/2005 | Abraham et al. | |
| 6,985,469 B2 * | 1/2006 | Leung ...................... 370/335 | |
| 6,993,683 B2 | 1/2006 | Bhat et al. | |
| 6,996,630 B1 | 2/2006 | Masaki et al. | |
| 7,013,157 B1 | 3/2006 | Norman et al. | |
| 7,020,438 B2 | 3/2006 | Sinivaara et al. | |
| 7,020,773 B1 | 3/2006 | Otway et al. | |
| 7,024,199 B1 | 4/2006 | Massie et al. | |
| 7,024,394 B1 | 4/2006 | Ashour et al. | |
| 7,027,773 B1 | 4/2006 | McMillin | |
| 7,031,705 B2 | 4/2006 | Grootwassink | |
| 7,035,220 B1 | 4/2006 | Simcoe | |
| 7,039,037 B2 | 5/2006 | Wang et al. | |
| 7,058,414 B1 | 6/2006 | Rofheart et al. | |
| 7,062,566 B2 | 6/2006 | Amara et al. | |
| 7,068,999 B2 | 6/2006 | Ballai | |
| 7,079,537 B1 | 7/2006 | Kanuri et al. | |
| 7,089,322 B1 | 8/2006 | Stallmann | |
| 7,092,529 B2 * | 8/2006 | Yu et al. ................... 381/71.11 | |
| 7,110,756 B2 | 9/2006 | Diener | |
| 7,116,979 B2 | 10/2006 | Backes et al. | |
| 7,126,913 B1 | 10/2006 | Patel et al. | |
| 7,134,012 B2 | 11/2006 | Doyle et al. | |
| 7,139,829 B2 | 11/2006 | Wenzel et al. | |
| 7,142,867 B1 | 11/2006 | Gandhi et al. | |
| 7,146,166 B2 | 12/2006 | Backes et al. | |
| 7,155,236 B2 | 12/2006 | Chen et al. | |
| 7,155,518 B2 | 12/2006 | Forslow | |
| 7,158,777 B2 | 1/2007 | Lee et al. | |
| 7,159,016 B2 | 1/2007 | Baker | |
| 7,221,927 B2 | 5/2007 | Kolar et al. | |
| 7,224,970 B2 | 5/2007 | Smith et al. | |
| 7,239,862 B1 | 7/2007 | Clare et al. | |
| 7,246,243 B2 | 7/2007 | Uchida | |
| 7,263,366 B2 | 8/2007 | Miyashita | |
| 7,274,730 B2 | 9/2007 | Nakabayashi | |
| 7,280,495 B1 | 10/2007 | Zweig et al. | |
| 7,290,051 B2 | 10/2007 | Dobric et al. | |
| 7,293,136 B1 | 11/2007 | More et al. | |
| 7,310,664 B1 | 12/2007 | Merchant et al. | |
| 7,317,914 B2 | 1/2008 | Adya et al. | |
| 7,320,070 B2 | 1/2008 | Baum | |
| 7,324,468 B2 | 1/2008 | Fischer | |
| 7,324,487 B2 | 1/2008 | Saito | |
| 7,324,489 B1 | 1/2008 | Iyer et al. | |
| 7,350,077 B2 | 3/2008 | Meier et al. | |
| 7,359,676 B2 | 4/2008 | Hrastar | |
| 7,370,362 B2 | 5/2008 | Olson et al. | |
| 7,376,080 B1 | 5/2008 | Riddle et al. | |
| 7,379,423 B1 | 5/2008 | Caves et al. | |
| 7,382,756 B2 | 6/2008 | Barber et al. | |
| 7,417,953 B2 | 8/2008 | Hicks et al. | |
| 7,421,248 B1 | 9/2008 | Laux et al. | |
| 7,421,487 B1 | 9/2008 | Peterson et al. | |
| 7,440,416 B2 | 10/2008 | Mahany et al. | |
| 7,443,823 B2 | 10/2008 | Hunkeler et al. | |
| 7,447,502 B2 | 11/2008 | Buckley | |
| 7,460,855 B2 | 12/2008 | Barkley et al. | |
| 7,466,678 B2 | 12/2008 | Cromer et al. | |
| 7,475,130 B2 | 1/2009 | Silverman | |
| 7,477,894 B1 | 1/2009 | Sinha | |
| 7,480,264 B1 | 1/2009 | Duo et al. | |
| 7,483,390 B2 | 1/2009 | Rover et al. | |
| 7,489,648 B2 | 2/2009 | Griswold | |
| 7,493,407 B2 | 2/2009 | Leedom et al. | |
| 7,505,434 B1 | 3/2009 | Backes | |
| 7,509,096 B2 | 3/2009 | Palm et al. | |
| 7,529,925 B2 | 5/2009 | Harkins | |
| 7,551,574 B1 | 6/2009 | Peden, II et al. | |
| 7,551,619 B2 | 6/2009 | Tiwari | |
| 7,558,266 B2 | 7/2009 | Hu | |
| 7,570,656 B2 | 8/2009 | Raphaeli et al. | |
| 7,573,859 B2 | 8/2009 | Taylor | |
| 7,577,453 B2 | 8/2009 | Matta | |
| 7,592,906 B1 | 9/2009 | Hanna et al. | |
| 7,636,363 B2 | 12/2009 | Chang et al. | |
| 7,680,501 B2 | 3/2010 | Sillasto et al. | |
| 7,693,526 B2 | 4/2010 | Qian et al. | |
| 7,715,432 B2 | 5/2010 | Bennett | |
| 7,716,379 B2 | 5/2010 | Ruan et al. | |
| 7,724,703 B2 | 5/2010 | Matta et al. | |
| 7,724,704 B2 | 5/2010 | Simons et al. | |
| 7,729,278 B2 | 6/2010 | Chari et al. | |
| 7,733,868 B2 | 6/2010 | Van Zijst | |
| 7,746,897 B2 | 6/2010 | Stephenson et al. | |
| 7,788,475 B2 | 8/2010 | Zimmer et al. | |
| 7,805,529 B2 | 9/2010 | Galluzzo et al. | |
| 7,817,554 B2 | 10/2010 | Skog et al. | |
| 7,844,298 B2 | 11/2010 | Riley | |
| 7,865,713 B2 | 1/2011 | Chesnutt et al. | |
| 7,873,061 B2 | 1/2011 | Gast et al. | |
| 7,894,852 B2 | 2/2011 | Hansen | |
| 7,912,982 B2 | 3/2011 | Murphy | |
| 7,929,922 B2 * | 4/2011 | Kubo ............................. 455/101 | |
| 7,945,399 B2 * | 5/2011 | Nosovitsky et al. ............ 702/57 | |
| 2001/0024953 A1 | 9/2001 | Balogh | |
| 2002/0021701 A1 | 2/2002 | Lavian et al. | |
| 2002/0052205 A1 | 5/2002 | Belostotsky et al. | |
| 2002/0060995 A1 | 5/2002 | Cervello et al. | |
| 2002/0062384 A1 | 5/2002 | Tso | |
| 2002/0069278 A1 | 6/2002 | Forslow | |
| 2002/0078361 A1 | 6/2002 | Giroux et al. | |
| 2002/0080790 A1 | 6/2002 | Beshai | |
| 2002/0087699 A1 | 7/2002 | Karagiannis et al. | |
| 2002/0094824 A1 | 7/2002 | Kennedy et al. | |
| 2002/0095486 A1 | 7/2002 | Bahl | |
| 2002/0101868 A1 | 8/2002 | Clear et al. | |
| 2002/0116655 A1 | 8/2002 | Lew et al. | |
| 2002/0157020 A1 | 10/2002 | Royer | |
| 2002/0174137 A1 | 11/2002 | Wolff et al. | |
| 2002/0176437 A1 | 11/2002 | Busch et al. | |
| 2002/0191572 A1 | 12/2002 | Weinstein et al. | |
| 2002/0194251 A1 | 12/2002 | Richter et al. | |
| 2003/0014646 A1 | 1/2003 | Buddhikot et al. | |
| 2003/0018889 A1 | 1/2003 | Burnett et al. | |
| 2003/0043073 A1 | 3/2003 | Gray et al. | |
| 2003/0055959 A1 | 3/2003 | Sato | |
| 2003/0107590 A1 | 6/2003 | Levillain et al. | |
| 2003/0120764 A1 | 6/2003 | Laye et al. | |
| 2003/0133450 A1 | 7/2003 | Baum | |

| | | |
|---|---|---|
| 2003/0134642 A1 | 7/2003 | Kostic et al. |
| 2003/0135762 A1 | 7/2003 | Macaulay |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0143428 A1 | 7/2004 | Rappaport et al. |
| 2004/0165545 A1 | 8/2004 | Cook |
| 2004/0174900 A1 | 9/2004 | Volpi et al. |
| 2004/0184475 A1 | 9/2004 | Meier |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0252656 A1 | 12/2004 | Shiu et al. |
| 2004/0255167 A1 | 12/2004 | Knight |
| 2004/0259542 A1 | 12/2004 | Viitamaki et al. |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0259597 A1 | 11/2005 | Benedetto et al. |
| 2005/0259611 A1 | 11/2005 | Bhagwat et al. |
| 2005/0270992 A1 | 12/2005 | Sanzgiri et al. |
| 2005/0273442 A1 | 12/2005 | Bennett et al. |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1 | 4/2006 | Pirzada et al. |
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0174336 A1 | 8/2006 | Chen |
| 2006/0178168 A1 | 8/2006 | Roach |
| 2006/0182118 A1 | 8/2006 | Lam et al. |
| 2006/0189311 A1 | 8/2006 | Cromer et al. |
| 2006/0193258 A1 | 8/2006 | Ballai |
| 2006/0200862 A1 | 9/2006 | Olson et al. |
| 2006/0206582 A1 | 9/2006 | Finn |
| 2006/0215601 A1 | 9/2006 | Vleugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1 | 11/2006 | Harkins |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0008884 A1 | 1/2007 | Tang |
| 2007/0011318 A1 | 1/2007 | Roth |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0054616 A1 | 3/2007 | Culbert |
| 2007/0058598 A1 | 3/2007 | Ling |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0083924 A1 | 4/2007 | Lu |
| 2007/0086378 A1 | 4/2007 | Matta et al. |
| 2007/0086397 A1 | 4/2007 | Taylor |
| 2007/0086398 A1 | 4/2007 | Tiwari |
| 2007/0091845 A1 | 4/2007 | Brideglall |
| 2007/0091889 A1 | 4/2007 | Xiao et al. |
| 2007/0098086 A1* | 5/2007 | Bhaskaran .............. 375/240.27 |
| 2007/0104197 A1 | 5/2007 | King |
| 2007/0115842 A1 | 5/2007 | Matsuda et al. |

| | | | |
|---|---|---|---|
| 2007/0133494 A1 | 6/2007 | Lai et al. | |
| 2007/0135866 A1 | 6/2007 | Baker et al. | |
| 2007/0136372 A1 | 6/2007 | Proctor et al. | |
| 2007/0160046 A1 | 7/2007 | Matta | |
| 2007/0171909 A1 | 7/2007 | Pignatelli | |
| 2007/0183375 A1 | 8/2007 | Tiwari | |
| 2007/0189222 A1 | 8/2007 | Kolar et al. | |
| 2007/0195793 A1 | 8/2007 | Grosser et al. | |
| 2007/0230457 A1 | 10/2007 | Kodera et al. | |
| 2007/0248009 A1 | 10/2007 | Petersen | |
| 2007/0253380 A1 | 11/2007 | Jollota et al. | |
| 2007/0255116 A1 | 11/2007 | Mehta et al. | |
| 2007/0258448 A1 | 11/2007 | Hu | |
| 2007/0260720 A1 | 11/2007 | Morain | |
| 2007/0268506 A1 | 11/2007 | Zeldin | |
| 2007/0268514 A1 | 11/2007 | Zeldin et al. | |
| 2007/0268515 A1 | 11/2007 | Freund et al. | |
| 2007/0268516 A1 | 11/2007 | Bugwadia et al. | |
| 2007/0286208 A1 | 12/2007 | Kanada et al. | |
| 2007/0287390 A1 | 12/2007 | Murphy et al. | |
| 2007/0291689 A1 | 12/2007 | Kapur et al. | |
| 2007/0297329 A1 | 12/2007 | Park et al. | |
| 2008/0002588 A1 | 1/2008 | McCaughan et al. | |
| 2008/0008117 A1 | 1/2008 | Alizadeh-Shabdiz | |
| 2008/0013481 A1 | 1/2008 | Simons et al. | |
| 2008/0014916 A1 | 1/2008 | Chen | |
| 2008/0031257 A1 | 2/2008 | He | |
| 2008/0056200 A1 | 3/2008 | Johnson | |
| 2008/0056211 A1 | 3/2008 | Kim et al. | |
| 2008/0064356 A1 | 3/2008 | Khayrallah | |
| 2008/0069018 A1 | 3/2008 | Gast | |
| 2008/0080441 A1 | 4/2008 | Park et al. | |
| 2008/0102815 A1 | 5/2008 | Sengupta et al. | |
| 2008/0107077 A1 | 5/2008 | Murphy | |
| 2008/0114784 A1 | 5/2008 | Murphy | |
| 2008/0117822 A1 | 5/2008 | Murphy et al. | |
| 2008/0151844 A1 | 6/2008 | Tiwari | |
| 2008/0159319 A1 | 7/2008 | Gast et al. | |
| 2008/0162921 A1 | 7/2008 | Chesnutt et al. | |
| 2008/0226075 A1 | 9/2008 | Gast | |
| 2008/0228942 A1 | 9/2008 | Lor et al. | |
| 2008/0250496 A1 | 10/2008 | Namihira | |
| 2008/0261615 A1 | 10/2008 | Kalhan | |
| 2008/0276303 A1 | 11/2008 | Gast | |
| 2009/0031044 A1 | 1/2009 | Barrack et al. | |
| 2009/0046688 A1 | 2/2009 | Volpi et al. | |
| 2009/0059930 A1 | 3/2009 | Ryan et al. | |
| 2009/0067436 A1 | 3/2009 | Gast | |
| 2009/0073905 A1 | 3/2009 | Gast | |
| 2009/0131082 A1 | 5/2009 | Gast | |
| 2009/0198999 A1 | 8/2009 | Harkins | |
| 2009/0257437 A1 | 10/2009 | Tiwari | |
| 2009/0260083 A1 | 10/2009 | Szeto et al. | |
| 2009/0274060 A1 | 11/2009 | Taylor | |
| 2009/0287816 A1 | 11/2009 | Matta et al. | |
| 2009/0293106 A1 | 11/2009 | Gray et al. | |
| 2010/0002610 A1 | 1/2010 | Bowser et al. | |
| 2010/0024007 A1 | 1/2010 | Gast | |
| 2010/0040059 A1 | 2/2010 | Hu | |
| 2010/0067379 A1 | 3/2010 | Zhao et al. | |
| 2010/0172276 A1 | 7/2010 | Aragon | |
| 2010/0180016 A1 | 7/2010 | Bugwadia et al. | |
| 2010/0195549 A1 | 8/2010 | Aragon et al. | |
| 2010/0261475 A1 | 10/2010 | Kim et al. | |
| 2010/0329177 A1 | 12/2010 | Murphy et al. | |
| 2011/0128858 A1 | 6/2011 | Matta et al. | |
| 2011/0158122 A1 | 6/2011 | Murphy et al. | |

FOREIGN PATENT DOCUMENTS

| | | |
|---|---|---|
| EP | 1 542 409 A | 6/2005 |
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO 94/03986 | 2/1994 |
| WO | WO 99/11003 | 3/1999 |
| WO | WO 00/06271 A1 | 2/2000 |
| WO | WO 00/18148 | 3/2000 |
| WO | WO 02/089442 A1 | 11/2002 |
| WO | WO 03/085544 A1 | 10/2003 |
| WO | WO 2004/013986 A1 | 2/2004 |
| WO | WO 2004/095192 A2 | 11/2004 |
| WO | WO 2004/095800 A1 | 11/2004 |

OTHER PUBLICATIONS

Acampora and Winters, "System Applications for Wireless Indoor Communications" IEEE Communications Magazine, vol. 25, No. 8, Aug. 1987, pp. 11-20.

Bing and Subramanian, "A New Multiaccess Technique for Multimedia Wireless LANs" IEEE Global Telecommunications Conference, Nov. 3-8, 1997, pp. 1318-1322.

Durgin, et al., "Measurements and Models for Radio Path Loss and Penetration Loss in and Around Homes and Trees at 5.85 GHz", IEEE Transactions on Communications, vol. 46, No. 11, Nov. 1988, pp. 1484-1496.

Freret et al., Applications of Spread-Spectrum Radio to Wireless Terminal Communications, Conf. Record, Nat'l Telecom. Conf., Nov. 30-Dec. 4, IEEE, 1980, pp. 69.7.1-69.7.4.

Fortune et al., "Wise Design of Indoor Wireless Systems: Practical Computation and Optimization", IEEE Computational Science and Engineering, p. 58-68 (1995).

Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.

Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, "Packet Switching in Radio Channels: New Conflict-Free Multiple Access Schemes for a Small No. of Data Users", Conference record 1977 ICC vol. 2 of 3, Jun. 12-15 Chicago Illinois (1977).

LAN/MAN Standards Committee of the IEEE Computer Society, Part 11:Wireless Lan Medium Access Control (MAC) and Physical Layer (PHY) Specifications:Higher Speed Physical Layer Extension in the 2.4 GHz Band, IEEE Std, 802.11b (1999).

Okamoto and Xu, IEEE, "Multimedia Communications over Wireless LANs via the SWL Protocol" Proceedings of the 13th Annual Hawaii International Conference on System Sciences, pp. 54-63 (1997).

Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

Puttini, R., Percher, J., Me, L., and de Sousa, R. 2004. A fully distributed IDS for Manet. In *Proceedings of the Ninth international Symposium on Computers and Communications* 2004 vol. 2 (ISCC"04)-vol. 02 (Jun. 28-Jul. 1, 2004). ISCC. IEEE Computer Society, Washington, DC, 331-338.

P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.

Law, A:, "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).

P. Bahl et al., Radar: An In-Building RF-based User Location and Tracking System, Microsoft Research, Mar. 2000, 10 pages.

Latvala J. et al., Evaluation of RSSI-Based Human Tracking, Proceedings for the 2000 European Signal Processing Conference, Sep. 2000, 9 pages.

Bahl P. et al. "User Location and Tracking in an In-Building Radio Network," Microsoft Research, Feb. 1999, 13 pages.

P. Bahl et al., A Software System for Locating Mobile Users: Design, Evaluation, and Lessons, Microsoft Research, Feb. 1999, 13 pages.

Chen, Yen-Chen et al., "Enabling Location-Based Services on Wireless LANs", Networks, 2003. ICON2003. The 11th IEEE International Conference, Sep. 28-Oct. 1, 2003, pp. 567-572.

Erten, Y. Murat, "A Layered Security Architecture for Corporate 802.11 Wireless Networks", Wireless Telecommunications Symposium, May 14-15, 2004, pp. 123-128.

Kleine-Ostmann, T., et al., "A Data Fusion Architecture for Enhanced Position Estimation in Wireless Networks," IEEE Communications Letters, vol. 5(8), Aug. 2001, p. 343-345.

Pulson, Time Domain Corporation, Ultra wideband (UWB) Radios for Precision Location, Third IEEE Workshop on Wireless Local Area Networks, Sep. 27-28, 2001, 8 pages.

Barber, S., Monitoring 802.1 Networks, IEEE 802.11, Sydney, NSW, May 13-17, 2002.

Latvala, J. et al. "Patient Tracking in a Hospital Environment Using Extended Kalman-filtering," Proceedings of the 1999 Middle East Conference on Networking, Nov., 1999, 5 pages.

Myllymaki, P. et al., "A Probabilistic Approach to WLAN User Location Estimation," Third IEEE Workshop on Wireless Local Area Networks, Sep. 27-28, 2001, 12 pages.

Potter, B., and Fleck, B., 802.11 Security, O'Reilly Media Inc., Dec. 2002, 14 pages.

McCann, S., et al., "Emergency Services for 802," IEEE 802.11-07/0505r1, Mar. 2007, 27 pages.

Di Sorte, D., et al., "On the Performance of Service Publishing in IEEE 802.11 Multi-Access Environment," IEEE Communications Letters, vol. 11, No. 4, Apr. 2007, 3 pages.

Microsoft Computer Dictionary, Fifth Edition, Microsoft Corporation, 2002, 2 pages.

Thomson, Allan, Cisco Systems, AP Power Down Notification, Power Point slide show; IEEE standards committee meeting Jul. 15, 2008; doc.: IEEE 802.11-08/0759r0, 14 pages.

3COM, Wireless LAN Mobility System: Wireless LAN Switch and Controller Configuration Guide, 3COM, Revision A, Oct. 2004, 476 pages.

3COM, Wireless LAN Switch Manager (3WXM), 3COM, Revision C, Oct. 2004, 8 pages.

3COM, Wireless LAN Switch and Controller; Quick Start Guide, 3COM, Revision B, Nov. 2004, 10 pages.

3COM, Wireless LAN Mobility System; Wireless LAN Switch and Controller Installation and Basic Configuration Guide, Revision B, Apr. 2005, 496 pages.

Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).

Information Sciences Institute, RFC-791-Internet Protocol, DARPA, Sep. 1981.

U.S. Appl. No. 12/603,391 filed Oct. 21, 2009.
U.S. Appl. No. 12/763,057 filed Apr. 19, 2010.
U.S. Appl. No. 13/006,950 filed Jan. 14, 2011.
U.S. Appl. No. 09/866,474 filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office. Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/487,722, mailed Aug. 7, 2009.

Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/USO4/30683, mailed Feb. 10, 2006.
International Search Report and Written Opinion for PCT/USO4/30684, mailed Feb. 10, 2006.

\* cited by examiner

SMOOTHING FILTER FOR IRREGULAR UPDATE INTERVALS

BACKGROUND

In radio transmissions signal attenuation through a medium such as air, a wall, or water, reduces amplitude and intensity of the signal. At a receiver the signal has an associated strength, or received signal strength, that is typically less than the signal strength at a transmitter.

Radio signal strengths are used for various purposes, such as estimating a distance of a wireless station on a network. However, signal strength measurements are subject to considerable variance, even between consecutive messages from the same transmitter. The variance creates inaccuracies in client distance estimates. In wireless networking, it is not uncommon for a signal to vary by as much as +/−6 decibels confounding attempts to pin down locations, or providing the appearance of sporadic movement of a non-moving transmitter.

Further compounding the issue is the irregularity of sent messages. A station need not send messages at consistent intervals. Existing systems are commonly based on systems that sample signal strength at discrete intervals. As a irregularly transmitted signal does not have a discrete sample rate, prior systems are limited in their ability to estimate distance, motion and/or location of a station on a wireless network.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for determining a received signal strength value includes filtering noise from the received signal to provide an accurate signal strength value. One or more signals including a first sample and a second sample are transmitted from a transmitter to a receiver. The receiver provides values to a dynamically windowed filter. The dynamically windowed filter receives, as an input, a received signal strength value of the second sample, a dynamic time window, and a elapsed time value representing the amount of time that has passed between the receipt of the first sample and the second sample. The dynamically windowed filter weights the received signal strength value of the first sample to obtain a weighted input signal strength value. The dynamically windowed filter decays a previous output signal strength value to obtain a decayed input signal strength value. The dynamically windowed filter and adds the weighted input signal strength value to the decayed previous output signal strength value to obtain a filter output. The weighting can be a function of the dynamic time window and the time elapsed value. The technique dramatically reduces noise through filtering. Advantageously, the more accurate output signal strength can be used to identify movement or estimate distance, direction of movement, and/or current location of a station.

These and other advantages will become apparent to those skilled in the relevant art upon a reading of the following descriptions and a study of the several examples of the drawings.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
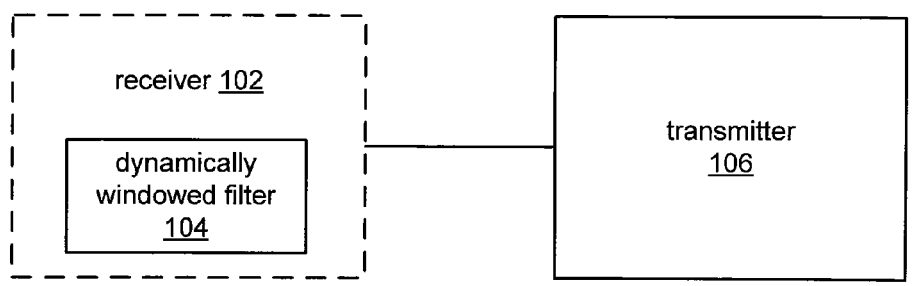
FIG. 1 depicts an example of a system for filtering noise from an irregularly received signal through a dynamically windowed filter.

FIG. 1 depicts an example of a system for filtering noise from an irregularly received signal through a dynamically windowed filter. FIG. 1 includes a receiver 102 and a transmitter 106. The receiver includes dynamically windowed filter 104.

In the example of FIG. 1, the receiver 102 can be practically any devices operable to receive a signal by radio transmission, and the transmitter 106 can be practically any device operable to transmit a signal by radio transmission. The dynamically windowed filter 104 includes include a processor and memory, such as a memory adapted to store time values, instructions and received signal strength values. The processor and the memory can be shared with the receiver 102. Alternately the dynamically windowed filter 104 can include its own processor and memory, such as on a daughter card connected to a mainboard of the receiver 102.

In the example of FIG. 1, in operation, a dynamic time window is allocated. The window can be set in seconds, milliseconds, nanoseconds, or on any known or convenient scale. Signals in the window will be considered in the filtering calculations, however, signals received too far in the past will be outside the window and will have decayed in prior calculations.

In the example of FIG. 1, in operation, two or more transmissions occur from the transmitter 106 to the receiver 102. A first sample is received at a first time and a second sample is received at a second time. A first time value is recorded at the time that the first sample is received and a second time value is recorded at a time that the second sample is received. The difference between the first time and the second time is recorded as a time elapsed value. Receiving the second sample can start a filtering process to produce an output signal strength value, or a value that has been filtered.

In the example of FIG. 1, in operation, the first sample is associated with a first sample signal strength that is recorded as a first sample signal strength value. Where prior calculations have been performed, the first sample signal strength value is associated with a previous output signal strength value. Where no prior calculations have been performed, the previous output signal strength value is initialized to a value, e.g. 0, 1.0, or any known or convenient initialization value. The second sample signal strength value is associated with a second sample signal strength and is used as an input to the dynamically windowed filter.

In the example of FIG. 1, in operation, the dynamically windowed filter 104 decays the previous output signal strength value to find a decayed previous output signal strength value. The filter weights the second sample signal strength value to find a weighted second sample signal strength value. The filter adds the decayed previous output signal strength value to the second sample signal strength value to find a current output signal strength value. The current output signal strength value is the output of the dynamically windowed filter.

In a non-limiting example, $(1-e^{-t/\tau})$ can be used to weight the second sample strength value, and $(e^{-t/\tau})$ can be used to weight the previous output signal strength value. The weights assigned herein can be calculated using one or more formulas, and can be adjusted as is known or convenient to suit a particular application.

In a non-limiting example, the receiver 102 could be a part of an ad hoc network, or alternatively, the receiver could a part of a an 802.11 infrastructure network. In the context of an infrastructure network, the receiver 102, can be included in an authorization unit (AUTH), and the transmitter 106 can be included in a station, for example, a laptop computing device, a desktop computing device, a hand held computing device, or any other known or convenient device.

Figure 2:
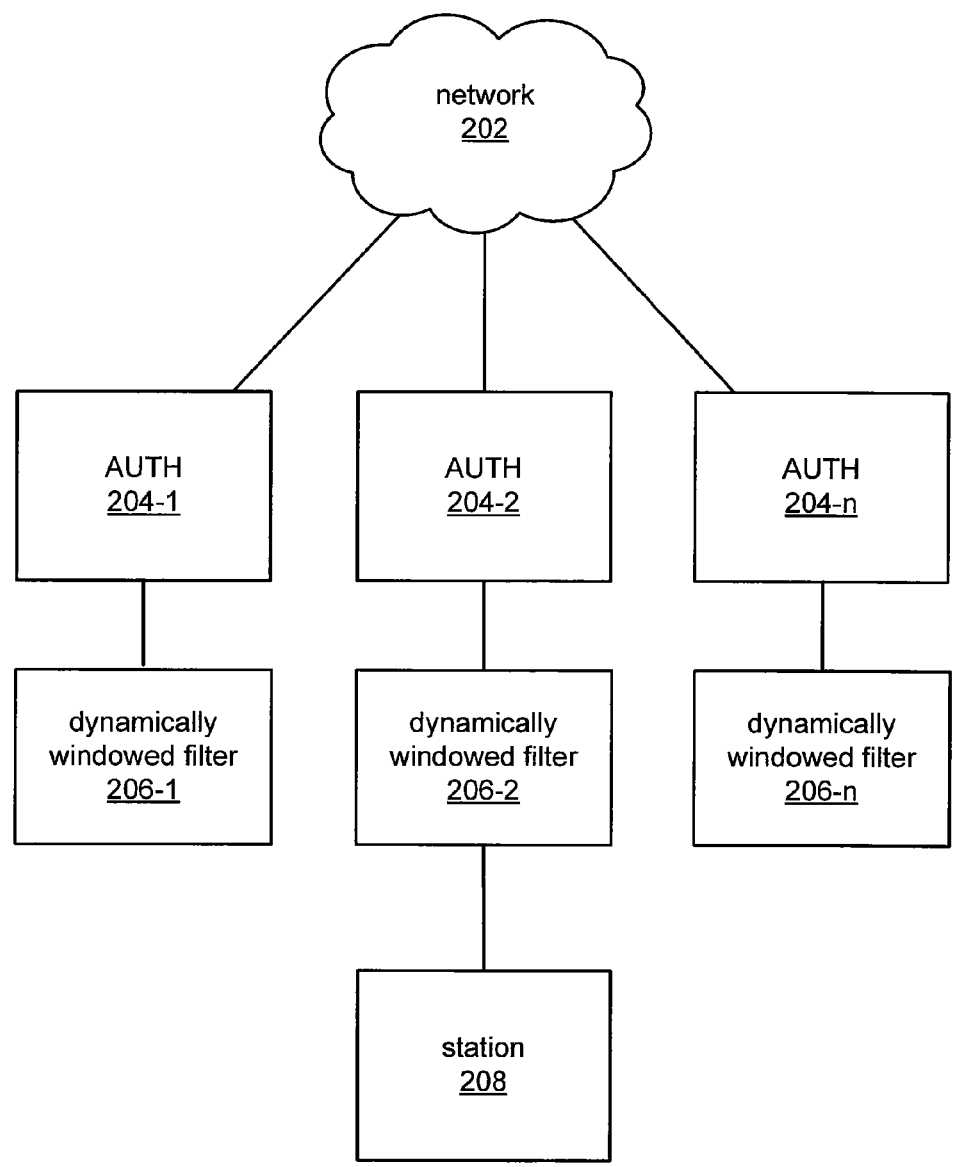
FIG. 2 depicts an example of a wireless network receiving messages at an irregular rate from a wireless station ("station") and dynamically filtering the signal through a dynamically windowed filter.

FIG. 2 depicts an example of a wireless network receiving messages at an irregular rate from a wireless station ("station") and dynamically filtering the signal through a dynamically windowed filter. FIG. 2 includes optional network 202, AUTH 204-1, AUTH 204-2, AUTH 204-n (collectively AUTHs 204), dynamically windowed filter 206-1, dynamically windowed filter 206-2, dynamically windowed filter 206-n (dynamically windowed filters 206), and station 208. As depicted for clarity, AUTHs 204 are coupled to dynamically windowed filters 206, however, AUTHs 204 could include dynamically windowed filters 206.

In the example of FIG. 2, the network 202 couples AUTHs 204. The network 202 can be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 2, AUTHs 204 are hardware units acting as communication nodes by linking wireless mobile stations such as personal computers (PCs) to controller 202 via dynamically windowed filters 206. The AUTHs 204 may generally perform authentication operations to associate stations. In an example, the AUTHs 204 connect users to other users, and may serve as a point of connection to a wired network. An AUTH includes a radio. In a non-limiting embodiment, the radio is configured for 802.11 standard transmissions.

In the example of FIG. 2, the AUTHs 204 communicate as peer-entities including distributed intelligence otherwise included in a controller. The distributed intelligence could be equivalent to that of a controller across the distributed AUTHs. Where a controller is used, the controller oversees the network and monitors connections of stations to AUTHs and can monitor location and movement of stations relative to AUTHs.

In the example of FIG. 2, the AUTHs 204-2 is coupled to the dynamically windowed filter 206-2. The dynamically windowed filter 206-2 can include its own processor and memory.

In the example of FIG. 2, the station 208 can be any computing device capable of wireless local area network (WLAN) communication. The station 208 is depicted as associated with AUTH 204-2, however, the station could associate with any one of the AUTHs 204. As associated with AUTHs 204-2, the station 208 can transmit signals to the AUTH 204-2 and the dynamically windowed filter 206-2 can filter the received signals.

In the example of FIG. 2, in operation, the station 208 transmits one or more messages to the AUTH 204-2. Each message is encoded as a wireless signal. A second to last signal received at the AUTH 204-2 can be referred to as a first sample. The first sample is received at a first time and has an associated signal strength value. The dynamically windowed filter 206-2 has a previous output signal strength value, such as from previous calculations or from initialization (where no prior calculations have been performed, the previous output signal strength value is initialized to a value, e.g. 0, 1.0, or any known or convenient initialization value).

In the example of FIG. 2, in operation, the station 208 transmits a second sample. The filter 206 determines an elapsed time value capturing an amount of time elapsed between the receipt of the first sample and the receipt of the second sample. The filter 206 weights the previous output signal strength value and the second sample signal strength value. Then the filter 206 adds the weighted previous output signal strength value to the weighted second sample signal strength value to find a current output signal strength value.

Figure 3:
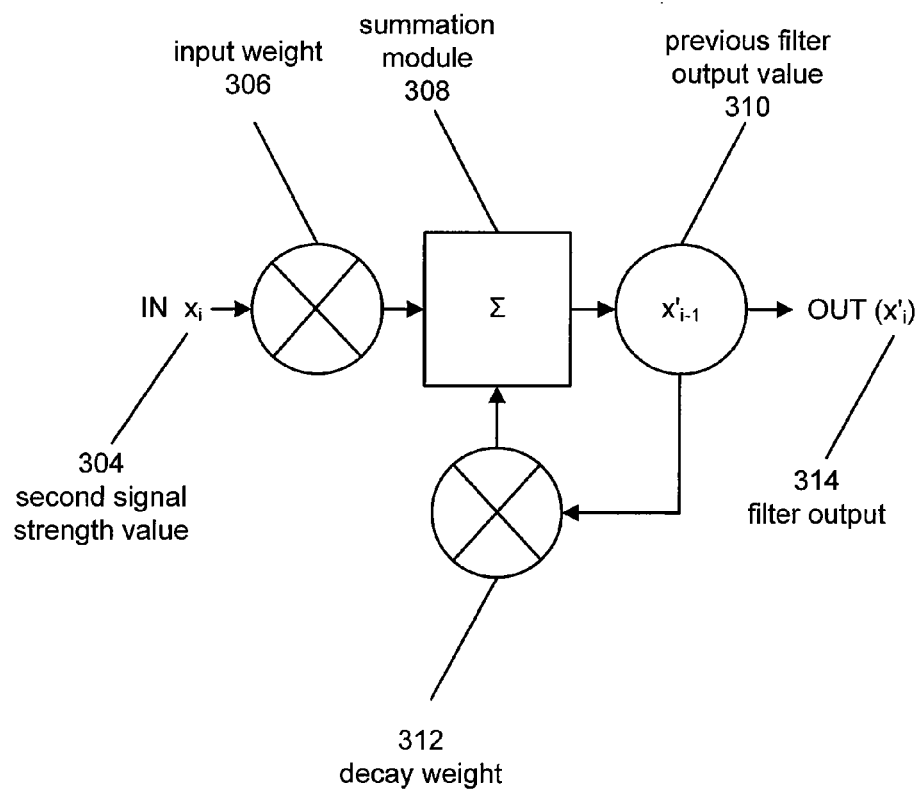
FIG. 3 depicts an example of a filter including an input, an output and weights.

FIG. 3 depicts an example of a filter 300 including an input, an output and weights. FIG. 3 includes $x_i$ (second sample signal strength value) 304, input weight 306, summation ($\Sigma$) module 308, $x'_{i-1}$ (previous filter output value) 310, decay weight 312, and filter output 314.

In the example of FIG. 3, the second sample signal strength value 304 is a recorded value. The input weight 306 can include $1-e^{-t/\tau}$ where $\tau$ is the dynamic time window and t is the elapsed time value.

In the example of FIG. 3, the summation module 308 can be an addition module, such as a hardware adding machine, or in software as instructions executing on a processor to perform an addition function.

In the example of FIG. 3, the previous filter output value 310 is a value storing the previous output of the filter 310. Where no previous output of the filter has been determined, the previous filter output value 310 is initialized to an initialization value such as 0, 0.5, a pre-determined constant value, or any other known or convenient value.

In the example of FIG. 3, the decay weight 312 can include $e^{-t/\tau}$ where t is the elapsed time value discussed in reference to current signal strength weight 306 and $\tau$ is the dynamical time window discussed in reference to the input weight 306.

In the example of FIG. 3, the filter output 314 is a value that has been filtered by a dynamically windowed filter.

In the example of FIG. 3, in operation, a second sample signal strength value 304 is multiplied by the input weight which can include $[1-e^{-t/\tau}]$. The previous filter output value 310 is multiplied by the decay weight 312 to find a decayed previous output signal strength value. The summation module 308 adds the decayed previous output signal strength value to the weighted second sample signal strength value 304 to find a current filter output value. Then, the current filter output value is stored in the previous filter output value 310 for use in a subsequent calculation.

Figure 4:
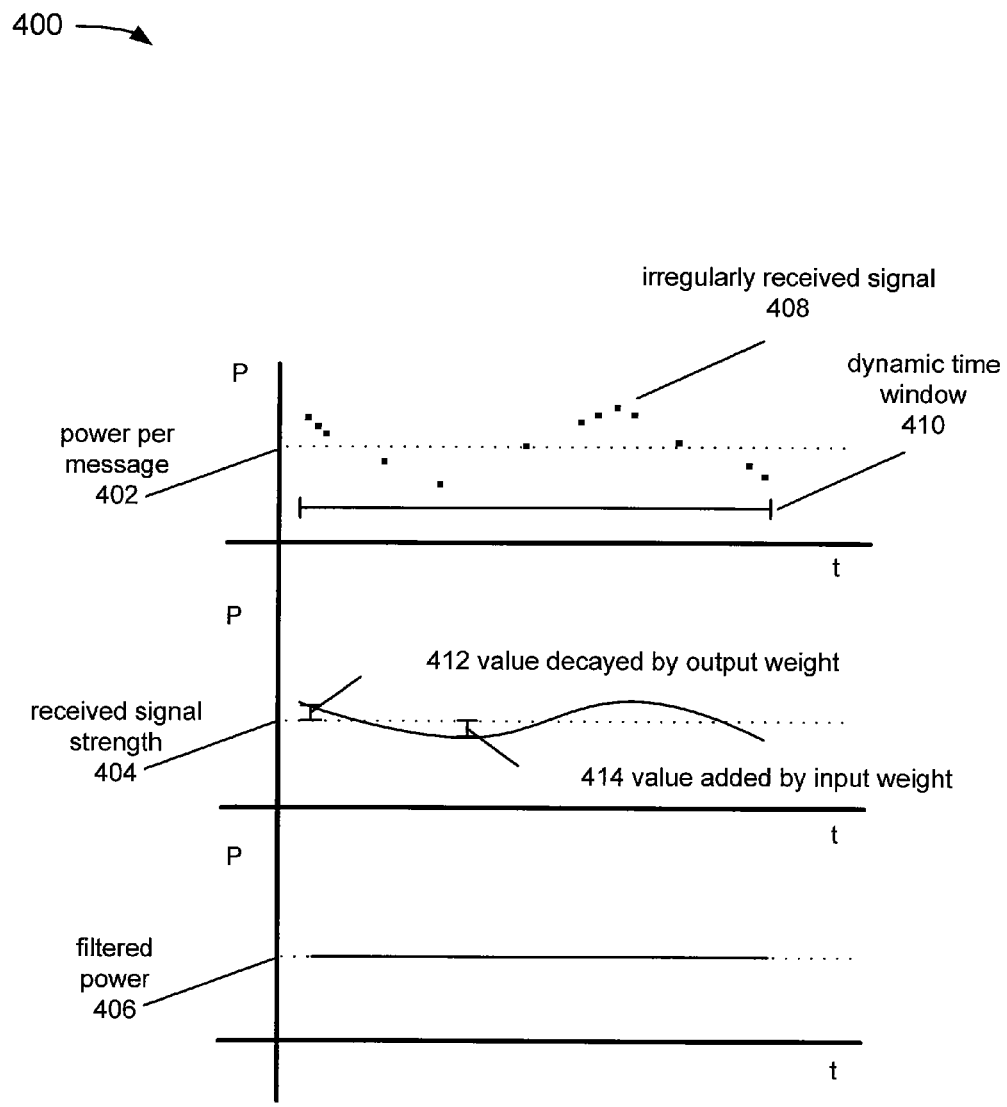
FIG. 4 depicts a diagram of an example of a plurality of graphs of sampled signal power, received signal strength, and filtered power output by a dynamically windowed filter.

FIG. 4 depicts a diagram of an example of a plurality of graphs of sampled signal power, received signal strength, and filtered power output by a dynamically windowed filter. FIG. 4 includes power per message 402, received signal strength 404, and filtered power 406. Power per message 402 includes irregularly received signal 408 and dynamic time window 410. Received signal strength 404 includes value decayed by output weight 412 and value added by input weight 414. In the example of FIG. 4, a station transmitting signals is not moving, and variation in signal power is attributed to noise on the signal.

Power per message 402 includes a number of points in irregularly received signal 408 representing signal strength values collected at various points in time. Some points cluster together indicating rapid transmission, but other points spread apart indicating less frequent transmission. The dynamic time window 410 indicates a time window over which to filter, such as 1 second, 100 milliseconds, 10 milliseconds, or on any known or convenient time scale.

The received signal strength 404 indicates a graph of signal strength to time without filtering. Such a graph could be found by interpolation, average, or any known or convenient manner. Value decayed by output weight 412 indicates a positive displacement that is attributable to noise, e.g. +6 db, and value added by input weight 414 indicates a negative displacement that is also attributable to noise, e.g. −6 db. The filtered power 406 includes a single value derived by dynamically filtering the points included in power per message 402 through the exemplary dynamic time window 410. Noise is removed.

Figure 5:
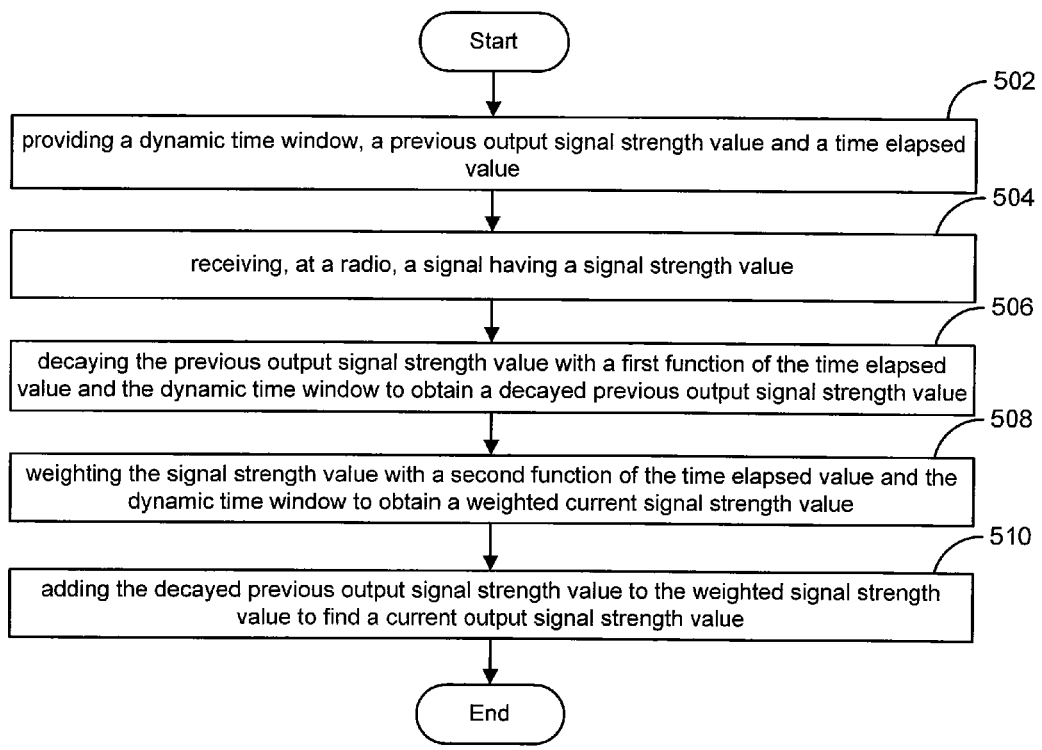
FIG. 5 depicts a flowchart of an example of a method for finding an output signal strength value using a dynamically windowed filter.

FIG. 5 depicts a flowchart of an example of a method for finding an output signal strength value using a dynamically windowed filter. The method is organized as a sequence of modules in the flowchart 500. However, it should be understood that these and other modules associated with other methods described herein may be reordered for parallel execution or into different sequences of modules.

In the example of FIG. 5, the flowchart begins at module 502 with providing a dynamic time window, a previous output signal strength value and a time elapsed value. If a first sample was received, or other prior calculations have been made, the previous output signal strength value is defined as the previous output of the filter based on a calculation using the first sample. If the previous output signal strength value is undefined, the previous output signal strength value can be set to a value of 0, a pre-defined numerical constant, or any known or convenient initialization value. The time elapsed value is a value representing the time that has passed since the receipt of a first sample.

In the example of FIG. 5, the flowchart continues to module 504 with receiving, at a radio, a signal having a signal strength value. The signal strength value is stored and the time elapsed value is set to the difference in time between the receipt of a first sample and receipt of the current signal. If no first sample was received, the time elapsed value is set to a value indicating the amount of time that the filter has been operating up to a maximum of the dynamic time window.

In the example of FIG. 5, the flowchart continues to module 506 with decaying the previous output signal strength value with a first function of the time elapsed value and the dynamic time window to obtain a decayed previous output signal strength value. The previous output signal strength value can be weighted by multiplying by a function of, e.g., $e^{-t/\tau}$. The function can include parameters for the dynamically allocated time constant value and the elapsed time. The result is the weighted previous output value.

In the example of FIG. 5, the flowchart continues to module 508 with weighting the signal strength value with a second function of the time elapsed value and the dynamic time window to obtain a weighted current signal strength value. The function can be expressed as $1-e^{-t/\tau}$ and the dynamically allocated time constant value. The result is a weighted signal strength value.

In the example of FIG. 5, the flowchart continues to module 510 with adding the decayed previous output signal strength value to the weighted signal strength value to find a current output signal strength value. Together the weighted output signal strength value and the weighted signal strength value produce the current output signal strength value. The current output signal strength value can be saved as a previous output signal strength value for future calculations. Having found a current output signal strength value, the flowchart terminates.

Figure 6:
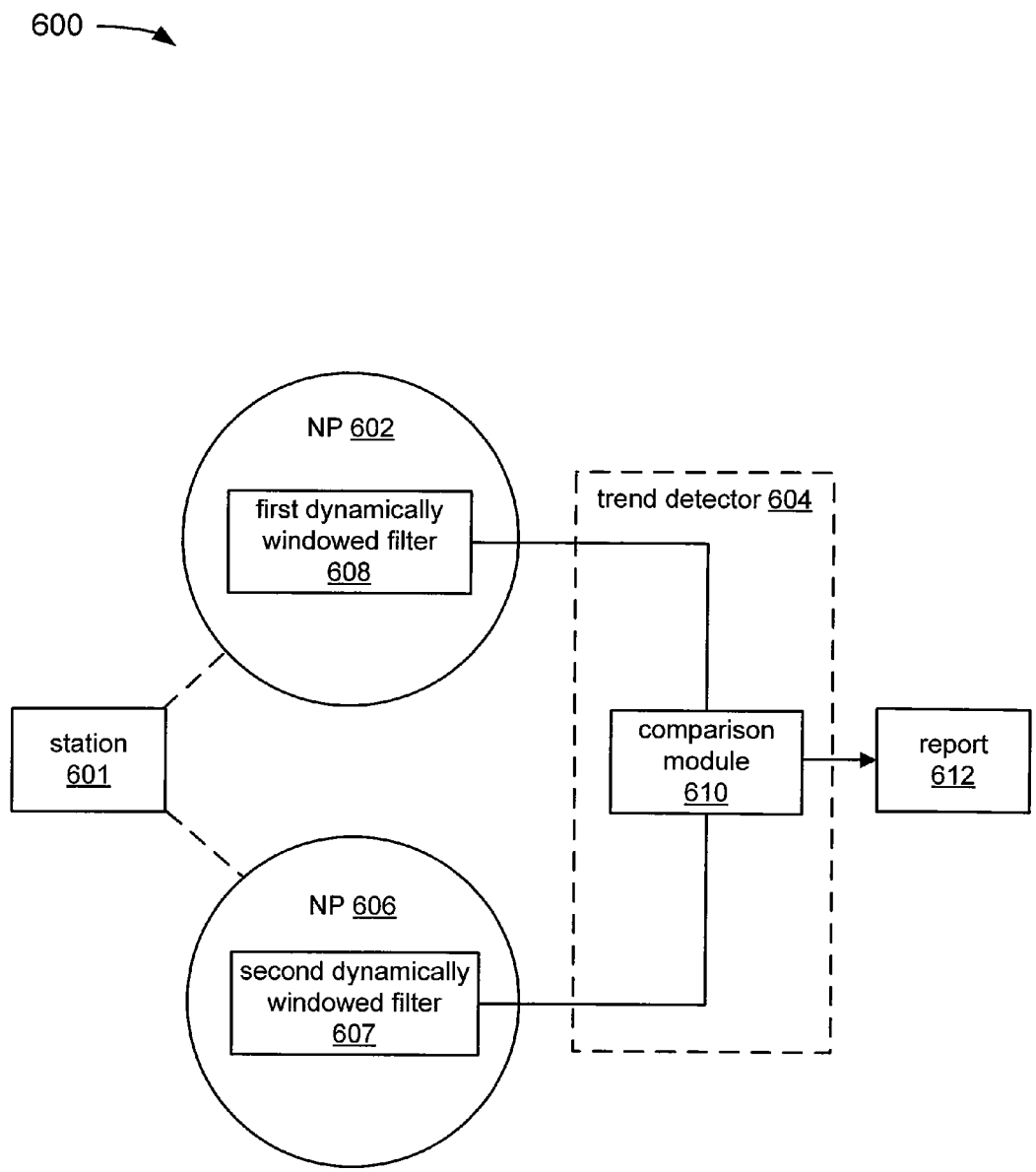
FIG. 6 depicts an example of a system for monitoring movement of a station.

FIG. 6 depicts an example of a system for monitoring movement of a station. FIG. 6 includes station 601, NP 602, trend detector 604, NP 606, and report 612. The NP 602 includes first dynamically windowed filter 608. Trend detector 604 includes comparison module 610. NP 606 includes second filter dynamically windowed filter 607. In the example of FIG. 6, NP 602 and NP 606 are coupled to the trend detector 604, such as by one or more networking units connected by, e.g., wired interface.

In the example of FIG. 2, the station 601 can be any computing device capable of wireless local area network (WLAN) communication.

NP 602 and NP 606 are hardware units acting as communication nodes by linking wireless mobile stations such as laptop personal computers to trend detector 604. First dynamically windowed filter 608 and second dynamically windowed filter 607 each determine current output signal strengths from irregularly received signals of one or more wireless stations in range of both NP 602 and NP 606.

Report 612 includes information about the station 601, such as direction of movement and can be data displayed to an administrator, saved to a log, or otherwise used or saved.

For the station 601, signal strengths increase as the wireless station approaches an NP. Where the signal strength is stronger at a first NP, than at a second NP, the station is closer to the NP having the stronger signal strength. Relative differences between the filter output signal strengths at the NP 602 and the NP 606 can be used to identify the direction of motion of a station.

In the example of FIG. 6, in operation, the comparison module 610 receives signal strengths of the station 601 in range of the NP 602 and/or the NP 606. The signal strength of the station 601 varies as the station moves closer or farther away. The comparison module 610 monitors the changing signal strengths and determines a direction of movement of the station relative to the NP 602 and the NP 606.

Figure 7:
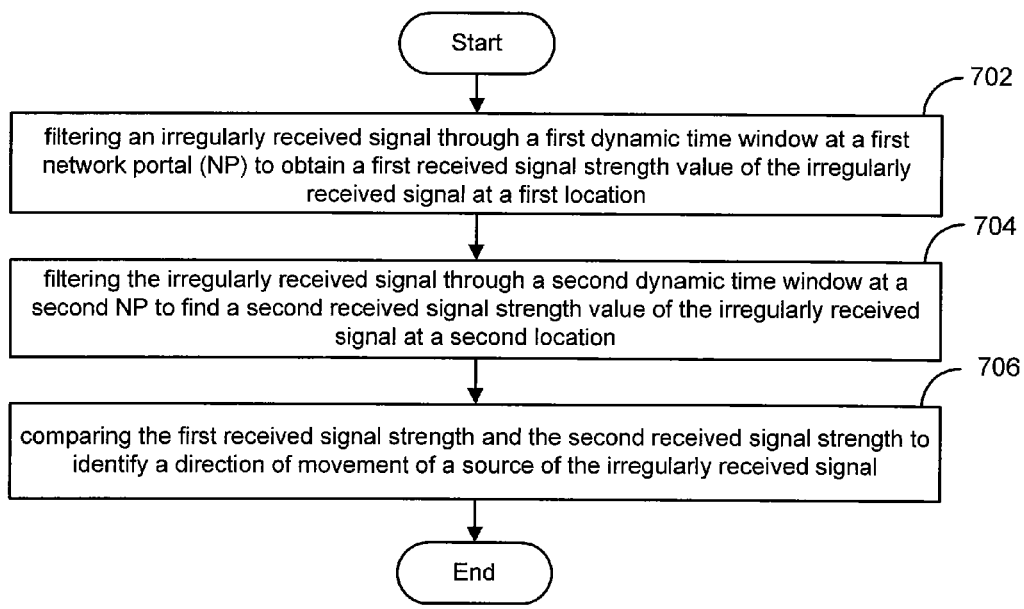
FIG. 7 depicts an example of a flowchart of a method for monitoring movement of a station.

FIG. 7 depicts an example of a flowchart 700 of a method for monitoring movement of a station. The method is organized as a sequence of modules in the flowchart 700. However, it should be understood that these and other modules associated with other methods described herein may be reordered for parallel execution or into different sequences of modules.

In the example of FIG. 7, the flowchart starts at module 702 with filtering an irregularly received signal through a first dynamic time window at a first network portal (NP) to obtain a first received signal strength value of the irregularly received signal at a first location. A station transmits messages to the first NP at irregular times, thus the signal is irregularly received. Each messages is associated with a signal having a signal strength value. The filter assigns weights to a previous output signal strength value and a current signal strength value and adds the weighted previous output signal strength and the weighted current signal strength to obtain a filter output. The weights include a function of a time elapsed value and a first dynamically allocated time constant. The output can be the first received signal strength.

In the example of FIG. 7, the flowchart continues to module 704 with filtering the irregularly received signal through a second dynamic time window at a second NP to find a second received signal strength value of the irregularly received signal at a second location. The irregularly received signal at the second NP is filtered in the same manner as the first NP however, the second NP can use the same time constant as the first NP, or a different time constant from the first NP.

In the example of FIG. 7, the flowchart continues to module 706 with comparing the first received signal strength and the second received signal strength to identify a direction of movement of a source of the irregularly received signal. Where the first NP has a stronger received signal strength than the second NP it can be said that the station is closer to the first NP than to the second NP. Over time signal strength values change as the station moves. The signal strength changes are monitored, and a direction of movement produced. Having identified the direction of movement the flowchart terminates.

Figure 8:
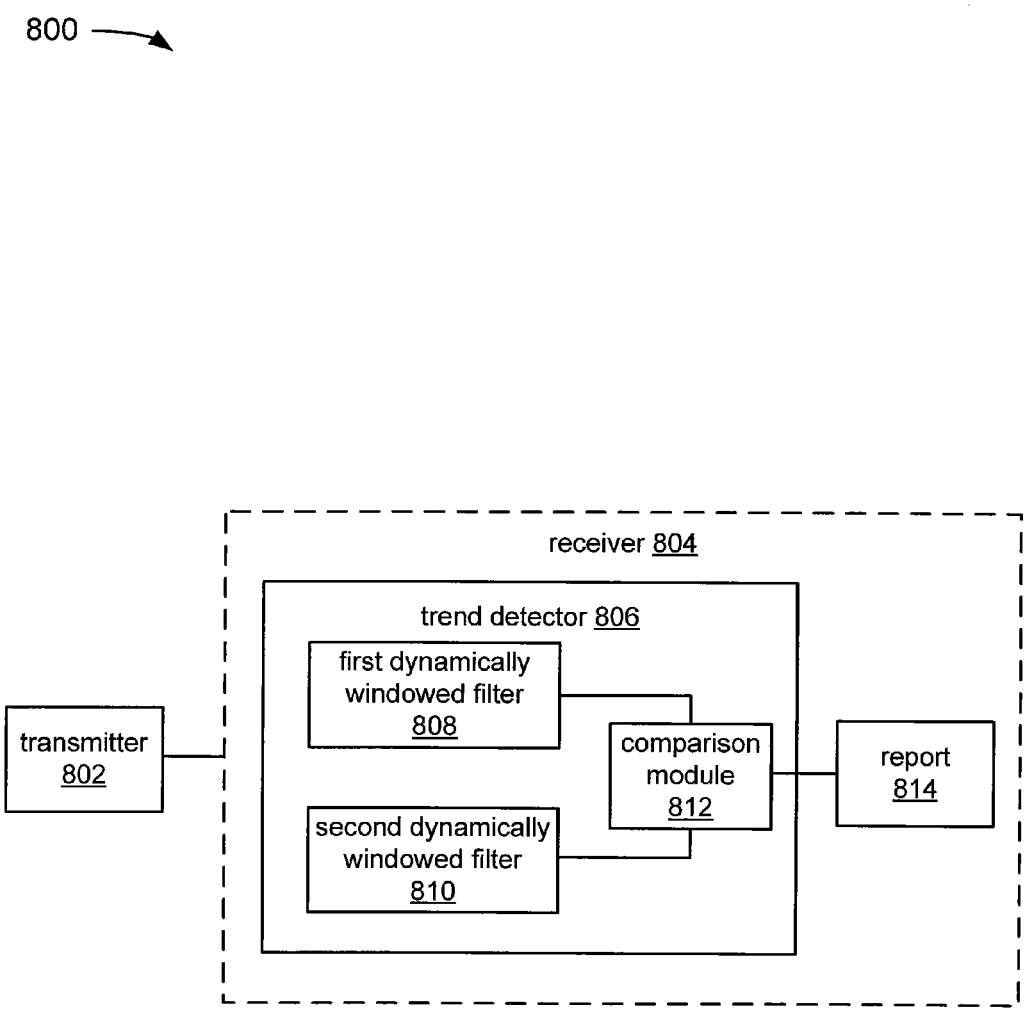
FIG. 8 depicts an example of a device for monitoring movement of a station.

FIG. 8 depicts an example of a device for monitoring movement of a station. FIG. 8 includes transmitter 802 and receiver 804. Receiver 804 includes trend detector 806 and report 814.

In the example of FIG. 8, the transmitter 802 can be practically any device operable to transmit a signal by radio transmission. The receiver 804 can be any device operable to receive a signal by radio transmission.

In the example of FIG. 8, the trend detector 806 includes first dynamically windowed filter 808, second dynamically filtered window 810 and comparison module 812. In the example of FIG. 8 the trend detector 806 is integrated into the receiver 804. The components depicted can be included on a single hardware unit, such as a motherboard, or can be constructed from one or more cards coupled to a circuit board of the receiver 804.

In the example of FIG. 8, the first dynamically windowed filter 808 has a first dynamic time window $\tau_1$ and the second dynamically windowed filter 810 has a second dynamic time window $\tau_2$. $\tau_1$ and $\tau_2$ are different so that the output of the first dynamically windowed filter 808 and the output of the second dynamically windowed filter 810 can be compared to determine whether an object is moving towards the receiver, away from the receiver, or is stationary relative to the receiver.

In a non-limiting example, where $\tau_1$ is associated with a smaller dynamic time window than $\tau_2$ and dynamically windowed filter 808 outputs a higher value than dynamically windowed filter 810, it can be estimated that the transmitter has moved closer to the receiver 804 because the signal has strengthened in the short term. The opposite could indicate that the transmitter 802 had moved farther away from the receiver 804. Where the output of dynamically windowed filter 808 equaled the output of dynamically windowed filter 810, the transmitter 802 can be said to be stationary relative to the receiver 804.

In the example of FIG. 8, information determined by comparing the output of the comparison module 812 could be used to decide whether or not to generate report 814. The trend detector 806 can be used to selectively generate more reports on transmitters with interesting trends, such as those moving rapidly toward the receiver, slowly away from the receiver, or any known or convenient trend suited for a particular application.

In the example of FIG. 8 in operation, the transmitter transmits a signal to the receiver 804 on an irregular basis. The trend detector 806 filters the signal twice, once with the first dynamically windowed filter 808 and also with the second dynamically windowed filter 810. The filter outputs are compared by the comparison module 812 to produce report 814.

Figure 9:
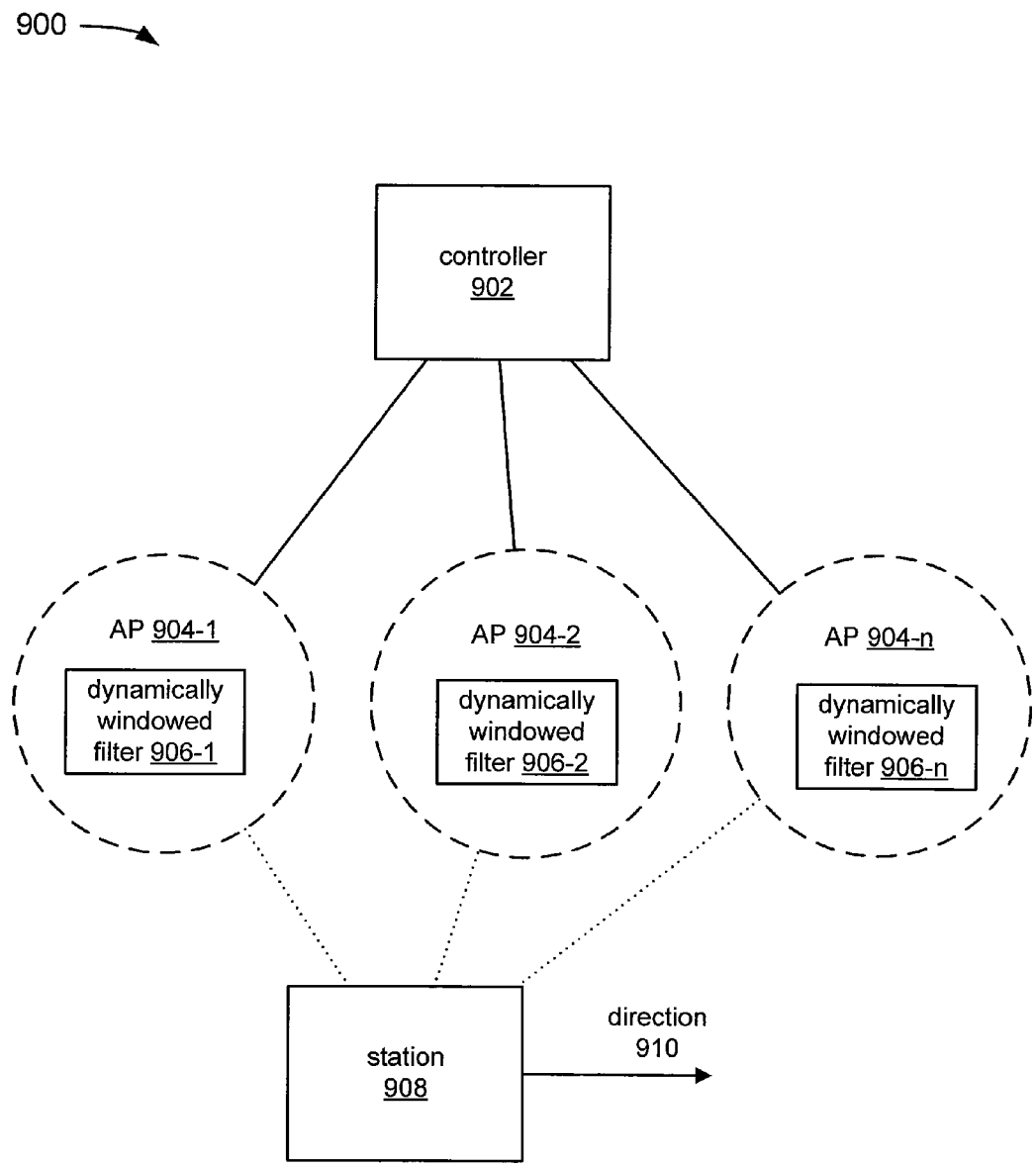
FIG. 9 depicts an example of a system for monitoring location and movement of a station using Access Points (APs).

FIG. 9 depicts an example of a system for monitoring location and movement of a station. FIG. 9 includes controller 902, Access Point (AP) 904-1, AP 904-2, AP 904-n (collectively APs 904), and station 908. AP 904-1 includes filter 906-1, AP 904-2 includes filter 906-2, and AP 904-n includes filter 906-n (collectively filters 906).

In the example of FIG. 9 the controller 902 is coupled to APs 904. The controller 902 oversees the network and monitors connections of stations to APs. The APs provide filtered signal strength values received from the APs 904 for stations in range of the APs. The controller 902 is aware of the physical location of each of APs 904. The filters 906 provide filtered signal strength values for stations in range of the APs 904.

In the example of FIG. 9 in operation, the APs 904 provide wireless network connectivity to the station 908. The station 908 moves in direction 910 while controller 902 monitors filtered signal strength outputs of the APs 904. The controller 902 interprets the filtered signal strength outputs of the APs 904 to identify a location and a direction of movement of the station 908. Advantageously, the location of the station 908 is constant as the noise in the transmitted signal is filtered.

In a non-limiting example, the direction could be identified by relating the filtered signal strength of the station to the known positions of the APs. If signal strength at both of AP 904-1 and AP 904-2 is decreasing, but stronger at AP 904-2, the station can be found to be moving to the right of AP 904-2. Specific identification of a direction, and speed can be extrapolated, for example, 1 foot/second in a direction of East.

Figure 10:
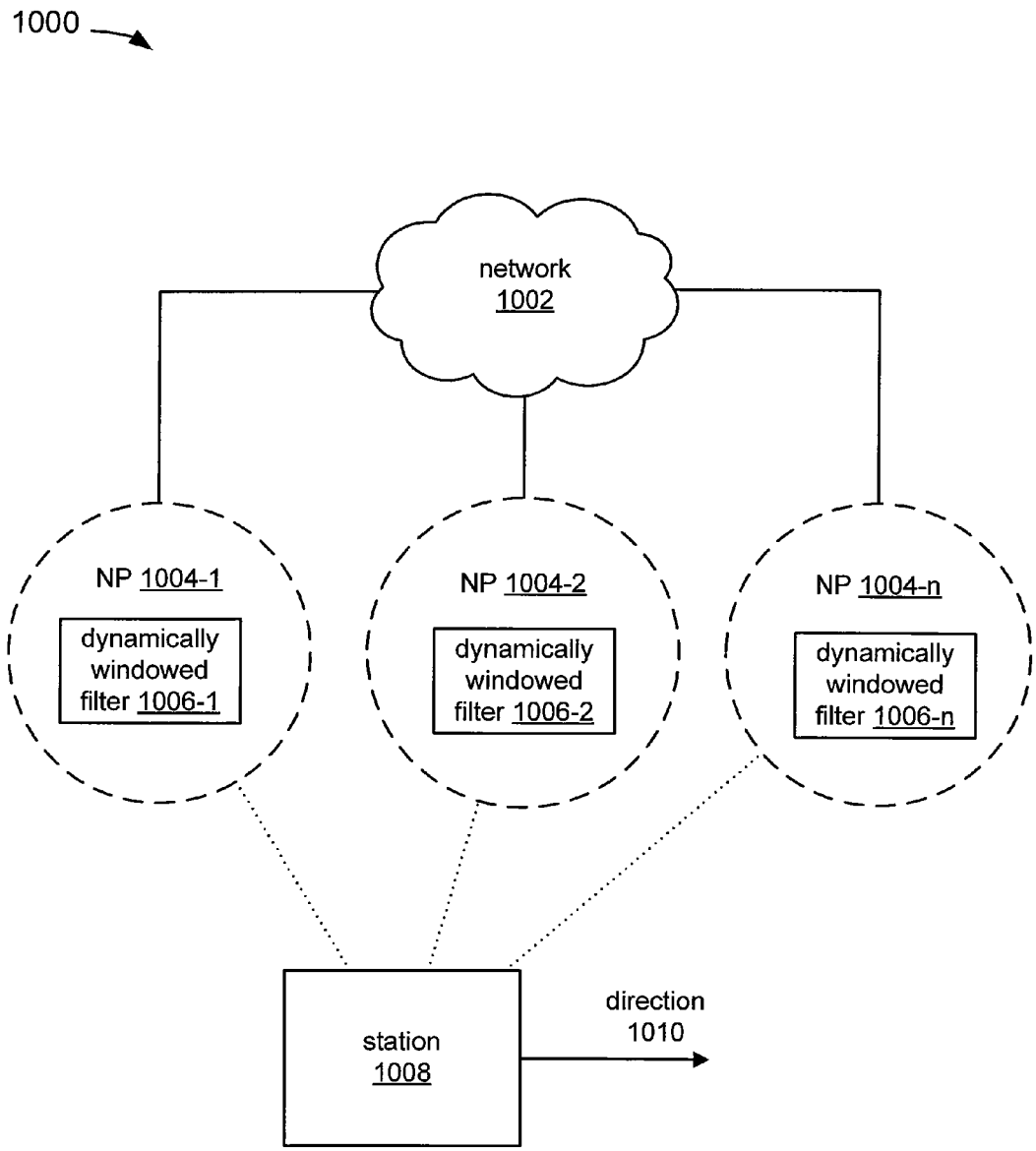
FIG. 10 depicts an example of a plurality of network portals (NPs) using dynamically windowed filters to monitor movement of a station.

FIG. 10 depicts an example of a plurality of network portals (NPs) using dynamically windowed filters to monitor movement of a station. FIG. 10 includes network 1002, NP 1004-1, NP 1004-2, NP 1004-n (collectively NPs 1004), and station 1008.

NPs 1004 include dynamically windowed filter 1006-1, dynamically windowed filter 1006-2, dynamically windowed filter 1006-n (collectively dynamically windowed filters 1006). The NPs 1004 are peer entities, that is the NPs 1004 operate together to allow access to the network 1002 and share information.

In the example of FIG. 10, the network 1002 couples NPs 1004. The network 1002 can be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 10, in operation, the station 1008 moves in direction 1010. The NPs monitor location and movement of the station by filtering received signal strength values from signals received from the station 1008. The NPs transmit filtered signal strength values to each other via network 1002. Each NP 1004 is aware of the physical location of the other NPs and is operable to obtain a direction of the station 1008 using the information received from the other NPs 1004.

Figure 11:
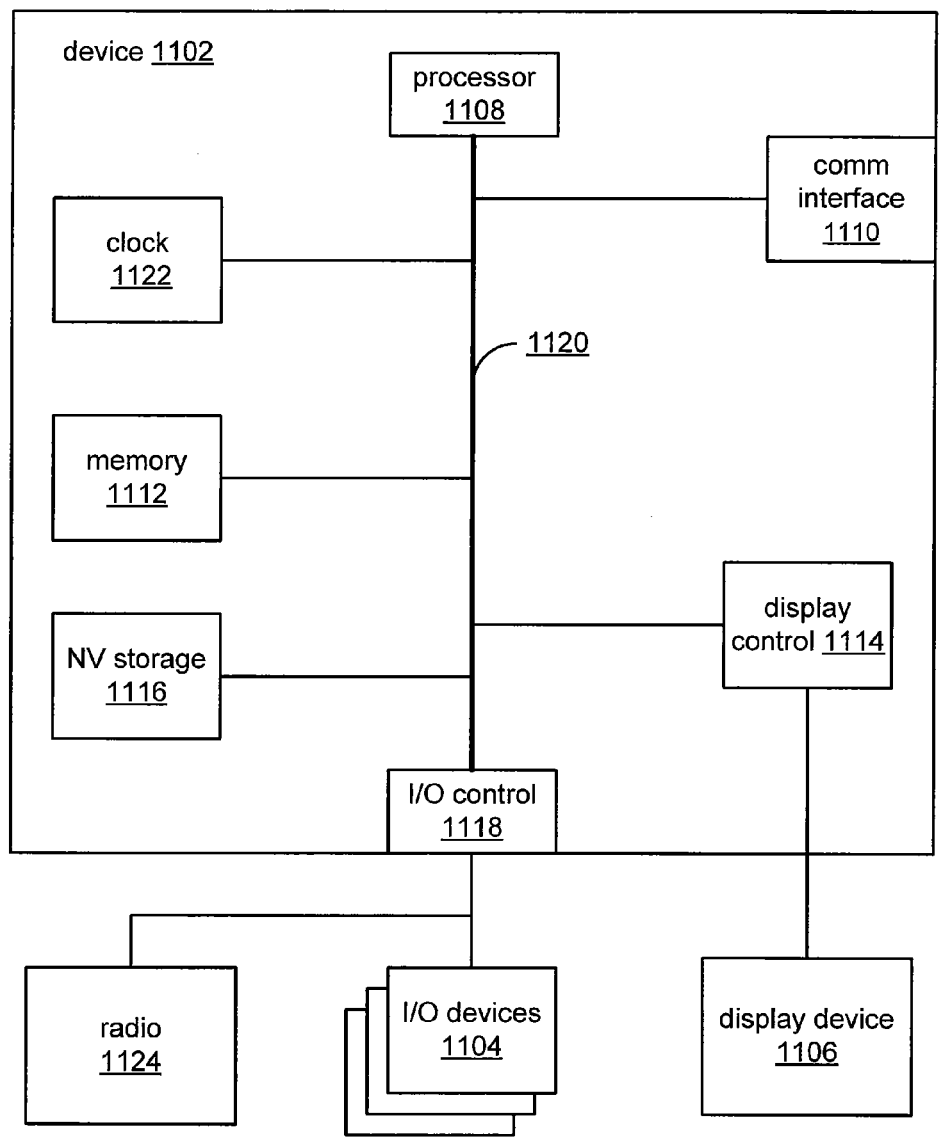
FIG. 11 depicts an example of a system representative of computing systems discussed herein, including various components.

FIG. 11 depicts an example of a system representative of computing systems discussed herein, including various components. The system 1100 may be a conventional computer system that can be used as a client computer system, such as a wireless client or a workstation, or a server computer system. The system 1100 includes a device 1102, I/O devices 1104, radio 1124 and a display device 1106. The device 1102 includes a processor 1108, a communications interface 1110, memory 1112, display controller 1114, non-volatile storage 1116, I/O controller 1118, clock 1122. The device 1102 may be coupled to or include the I/O devices 1104, the radio 1124, and the display device 1106.

The device 1102 interfaces to external systems through the communications interface 1110, which may include a modem or network interface. It will be appreciated that the communications interface 1110 can be considered to be part of the system 1100 or a part of the device 1102. The communications interface 1110 can be an analog modem, ISDN modem or terminal adapter, cable modem, token ring IEEE 1102.5 interface, Ethernet/IEEE 1102.3 interface, wireless 1102.11 interface, satellite transmission interface (e.g. "direct PC"), WiMAX/IEEE 1102.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 1108 may be, for example, a conventional microprocessor such as an Intel Pentium microprocessor or Motorola power PC microprocessor. The memory 1112 is coupled to the processor 1108 by a bus 1120. The memory 1112 can be Dynamic Random Access Memory (DRAM) and can also include Static RAM (SRAM). The bus 1120 couples the processor 1108 to the memory 1112, also to the non-volatile storage 1116, to the display controller 1114, and to the I/O controller 1118.

The I/O devices 1104 can include a keyboard, disk drives, printers, a scanner, and other input and output devices, including a mouse or other pointing device. The display controller 1114 may control in the conventional manner a display on the display device 1106, which can be, for example, a cathode ray tube (CRT) or liquid crystal display (LCD). The display controller 1114 and the I/O controller 1118 can be implemented with conventional well known technology.

The radio 1124 can include any combination of electronic components, for example, transistors, resistors and capacitors. The radio is operable to transmit and/or receive signals.

The non-volatile storage 1116 is often a magnetic hard disk, flash memory, an optical disk, or another form of storage for large amounts of data. Some of this data is often written, by a direct memory access process, into memory 1112 during execution of software in the device 1102. One of skill in the art will immediately recognize that the terms "machine-readable medium" or "computer-readable medium" includes any type of storage device that is accessible by the processor 1108.

Clock 1122 can be any kind of oscillating circuit creating an electrical signal with a precise frequency. In a non-limiting example, clock 1122 could be a crystal oscillator using the mechanical resonance of vibrating crystal to generate the electrical signal.

The system 1100 is one example of many possible computer systems which have different architectures. For example, personal computers based on an Intel microprocessor often have multiple buses, one of which can be an I/O bus for the peripherals and one that directly connects the processor 1108 and the memory 1112 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1112 for execution by the processor 1108. A Web TV system, which is known in the art, is also considered to be a computer system, but it may lack some of the features shown in FIG. 11, such as certain input or output devices. A typical computer system will usually include at least a processor, memory, and a bus coupling the memory to the processor.

In addition, the system 1100 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1116 and causes the processor 1108 to execute the various acts required by the operating system to input and output data and to store data in memory, including storing files on the non-volatile storage 1116.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

As used herein as a number, "e" refers Euler's number, the mathematical constant. While e is a real number, approximations of varying accuracy can be used for efficiency in calculations by one or more processing systems implementing the techniques disclosed herein. Approximation of calculations including Euler's number disclosed herein can be made by, e.g. an expression of a Taylor polynomial. Such an expression could be provided in integer calculations to avoid the need for floating point calculation hardware.

As used herein, a dynamic time window "$\tau$" (tau) is a value of time at any convenient scale, e.g., nanoseconds or milliseconds. For a calculation of a single current output signal strength, $\tau$ is constant across one or more different sub-calculations of the current output signal strength value. $\tau$ can be dynamically adjusted between calculations of current output signal strength values.

As used herein, an "elapsed time value" is a value representing an amount of time that has passed between receipt of a first sample and receipt of a second sample. The value can be expressed in seconds, milliseconds, nanoseconds, or on any known or convenient time scale. The value can be represented as a number in a binary, base 10, or in another convenient numerical representation system.

What is claimed is:

1. A system implemented in at least one of a memory or a processing device, comprising:
    a dynamically windowed filter configured to be coupled to a radio receiving a current sample signal associated with a current sample signal strength value;
    the dynamically windowed filter is configured to calculate a weighted input signal strength value from the current sample signal strength value;
    the dynamically windowed filter is configured to calculate a decayed previous filter output value from a previous output value;
    the dynamically windowed filter is configured to add the decayed previous filter output value to the weighted input signal strength value to define a filter output.

2. The system of claim 1, wherein the previous output value is based on a a previous sample signal received by the radio, the previous sample signal associated with a previous sample signal strength value.

3. The system of claim 1, wherein the dynamically windowed filter is configured to obtain a dynamic time window value, the dynamic time window being dynamically allocated as a factor of a weight applied to an input signal and a factor of a weight applied to a previous output signal.

4. The system of claim 1, wherein the dynamically windowed filter is configured to calculate the decayed previous filter output value by multiplying the previous filter output value by $e^{-t/\tau}$, wherein t is a time elapsed value of a difference in time between receipt of a previous sample signal and receipt of the current sample signal and $\tau$ represents a dynamic time window value.

5. The system of claim 1, wherein the dynamically windowed filter is configured to calculate the weighted input signal strength value by $1-e^{-t/\tau}$, wherein t is a time elapsed value of a difference in time between receipt of a previous sample signal and receipt of the current sample signal and $\tau$ represents a dynamic time window value.

6. The system of claim 1, wherein the dynamically windowed filter is configured to calculate the weighted input signal strength by calculating a function expressed as a Taylor polynomial approximation.

7. The system of claim 1, wherein the filter output is a first filter output, the dynamically windowed filter configured to define a second filter output based on a subsequent sample signal strength value and the current output signal strength value, the subsequent sample signal strength value based on a suqbsequent sample signal received by the radio.

8. The system of claim 1, wherein the dynamically windowed filter is configured to be coupled to a processor determining an elapsed time value by comparing (1) a first time value received from a clock when a previous sample signal is received with (2) a second time value received from the clock when the current sample signal was received.

9. A method, comprising:
    receiving a previous output signal strength value, a current signal strength value, and a time elapsed value;
    decaying the previous output signal strength value with (1) a first function of the time elapsed value and (2) a dynamic time window, to obtain a decayed previous output signal strength value;
    weighting the current signal strength value with (1) a second function of the time elapsed value and (2) the dynamic time window, to obtain a weighted current signal strength value;
    adding the decayed previous output signal strength value to the weighted current signal strength value to find a current output signal strength value.

10. The method of claim 9, wherein the first function and the second function include a ratio of the time elapsed value to a dynamically allocated time constant value.

11. The method of claim 9, wherein the first function is $1-e^{-t/\tau}$, wherein t is the time elapsed value and $\tau$ represents a dynamic time window value.

12. The method of claim 9, wherein the time elapsed value is determined as a difference between a first time when the current sample signal strength value is recorded and a second time when a previous sample signal strength value is recorded.

13. The method of claim 9, further comprising:
receiving a subsequent signal strength value; and
adding a weighted subsequent signal strength value to a decayed current output signal strength value to find a subsequent output signal strength value.

14. A non-transitory processor-readable medium storing code representing instructions to be executed by a processor, the code comprising code to cause a processor to:
define a weighted input signal strength value based on a current sample signal strength value;
define a decayed previous filter output value based on a previous filter output value;
combine the decayed previous filter output value and the weighted input signal strength value to obtain a filter output.

15. The non-transitory processor-readable medium of claim 14, wherein the previous filter output value is based on a previous sample signal, the previous sample signal associated with a previous sample signal strength value.

16. The non-transitory processor-readable medium of claim 14, the code further comprising code to cause a processor to receive a dynamic time window value, the dynamic time window is dynamically allocated as a factor of a weight applied to the sample signal strength value and a factor of a weight applied to a previous output filter value.

17. The non-transitory processor-readable medium of claim 14, wherein the decayed previous filter output value is defined by multiplying the previous filter output value by $e^{-t/\tau}$, wherein t is a time elapsed value of a difference in time between receipt of (1) a current sample signal associated with a current sample signal strength value and (2) a previous sample signal associated with previous filter output value, and $\tau$ represents a dynamic time window value.

18. The non-transitory processor-readable medium of claim 14, wherein the weighted input signal strength value is defined by $1-e^{-t/\tau}$, wherein t is a time elapsed value of a difference in time between receipt of a (1) a current sample signal associated with a current sample signal strength value and (2) a previous sample signal associated with previous filter output value and $\tau$ represents a dynamic time window value.

19. The non-transitory processor-readable medium of claim 14, wherein the weighted input signal strength value is defined by calculating a function expressed as a Taylor polynomial approximation and based on the sample signal strength value.

20. An apparatus, comprising:
a dynamic window filter configured to receive (1) a current signal strength value, (2) a previous output signal strength value, (3) a dynamic time window value, and (4) a time elapsed value,
the dynamic window filter configured to define a decayed previous output signal strength value based on the previous output signal strength, a first function of the time elapsed value, and the dynamic time window value,
the dynamic window filter configured to define a weighted current signal strength value based on the current signal strength value, a second function of the time elapsed value, and the dynamic time window value,
the dynamic window filter configured to define a current output signal strength value based on the decayed previous output signal strength value and the weighted current signal strength value.

* * * * *